United States Patent [19]

Kawakita et al.

[11] 4,334,285
[45] Jun. 8, 1982

[54] DIVIDER FOR CALCULATING BY SUMMATION THE QUOTIENT AND REMAINDER OF AN INTEGER DIVIDED BY A MERSENNE NUMBER AND A PARALLEL PROCESSOR SYSTEM COMPRISING MEMORY MODULES, A MERSENNE PRIME IN NUMBER

[75] Inventors: Kenji Kawakita; Takenori Makino; Norio Harada, all of Tokyo, Japan

[73] Assignee: Nippon Electric Co., Ltd., Tokyo, Japan

[21] Appl. No.: 166,877

[22] Filed: Jul. 8, 1980

[30] Foreign Application Priority Data

Jul. 11, 1979 [JP] Japan ................................ 54-87826

[51] Int. Cl.³ .............................................. G06F 7/52
[52] U.S. Cl. ...................................... 364/761; 364/900
[58] Field of Search .......................... 364/761, 900

[56] References Cited

U.S. PATENT DOCUMENTS 3,527,930 9/1970 Cocke et al. ...................... 364/761

Primary Examiner—David H. Malzahn
Attorney, Agent, or Firm—Sughrue, Mion, Zinn, Macpeak and Seas

[57] ABSTRACT

For division by a Mersenne number $(2^n - 1)$, a divided P is expressed as:

$$P = a_{k-1}(2^n)^{k-1} + a_{k-2}(2^n)^{k-2} + \ldots$$
$$+ a_i(2^n)^i + \ldots + a_2(2^n)^2 + a_1(2^n) + a_0.$$

A first summing unit sums up the coefficients $a_i$ s to provide a sum of a carry multiplied by $2^n$ and a sum portion less than $2^n$. The carry is added to the sum portion to provide a similar sum. When the sum portion of such a sum becomes less than $2^n$, the sum portion provides the remainder if it is less than the Mersenne number. If not, the remainder is rendered zero with an additional carry produced. A second summing unit calculates $$\left( \sum_{i=i}^{k-1} a_i \right) \text{'s}$$

for $i = 1$ to $(k-2)$. Each summation is given by a carry multiplied by $2^n$ plus a sum portion with the carry from the first summing unit and the additional carry added to the summation for $i = 1$ and with the carry from the summation $i = i - 1$ added to the summation for $i = i$. The sum portions calculated by the second summing unit with successive addition of the carries provide zeroth through $(k-2)$-th coefficients to $(2^n)^0$ through $(2^n)^{k-2}$ of a polynomial representative of the quotient, in which the carry from the summation for $i = k-2$, if not zero, provides the coefficient for $(2^n)^{k-1}$. For a parallel processor system, a Mersenne prime is used as the number of memory modules. The system preferably comprises a divider of the type described.

10 Claims, 3 Drawing Figures

DIVIDER FOR CALCULATING BY SUMMATION THE QUOTIENT AND REMAINDER OF AN INTEGER DIVIDED BY A MERSENNE NUMBER AND A PARALLEL PROCESSOR SYSTEM COMPRISING MEMORY MODULES, A MERSENNE PRIME IN NUMBER

BACKGROUND OF THE INVENTION

This invention relates to a divider for dividing a natural number by a Mersenne number to provide a quotient and a remainder. This invention relates also to a parallel processor system for use in, among others, an electronic digital computer.

A Mersenne number, known in mathematics, is represented by $(2^n-1)$, where the exponent to two n represents a natural number. A Mersenne number becomes a Mersenne prime when the exponent n is equal to one of certain ones of the natural numbers. Examples of such natural numbers are 1, 2, 3, 5, 7, 13, 17, 19, 31, ..., when the Mersenne numbers become 1, 3, 7, 31, 127, 8191, .... Inasmuch as the Mersenne number is herein used as a divisor for dividing a natural number, unity will be excluded from the Mersenne numbers and the Mersenne primes.

It is known to carry out division in an electronic digital computer by successive subtraction of a divisor from a dividend. The known process is time consuming particularly when the divisor is a prime number. When the dividend is given by g bits and the prime number, by r bits, the subtraction must be repeated (q−r) times with shift carries out a similar number of times. Because of the subtraction and shift repeated a number of times, the divider for a divisor equal to a prime number has a large volume of hardware. This is also the case with a divider for which a divisor is given by a Mersenne prime.

On the other hand, a parallel processor system comprising a plurality of processors and a plurality of memory modules is known, where a prime number is selected as the number of memory modules in order to suppress conflict of memory. An example of such a parallel processor system is described in a book "High Speed Computer and Algorithm Organization" edited by D. J. Kuck et al and published 1977 by Academic Press. According to Kuck et al, the prime number is rendered greater than the number of processors. The system described by Kuck et al is effective in carrying out numerical calculation according to algorithms of a certain type as, for example, in numerically solving differential equations. On accessing a memory cell of a desired one of the memory modules, each processor produces an address signal representative of a natural number. The natural number is divided by the prime number to provide a quotient and a remainder, by which the memory cell and the desired memory module are accessed, respectively. As pointed out hereinabove, it has heretofore been impossible to speedily carry out the division and extensive hardware has been indispensable. The parallel processor system has therefore been slow in operation and bulky when conflict of memory is suppressed. This applies even to the case where the prime number is selected from the Mersenne primes.

SUMMARY OF THE INVENTION

It is therefore an object of the present invention to provide a high-speed and yet compact divider for dividing a natural number by a Mersenne number in general to provide a quotient and a remainder.

It is another object of this invention to provide a divider of the type described, in which summation and carry are resorted to rather than subtraction and shift.

It is a further object of this invention to provide a parallel processor system, which is operable at a high speed with less hardware, with conflict of memory suppressed.

According to this invention, there is provided a divider for dividing a natural number P by a Mersenne number to provide a quotient and a remainder. The natural number P is given by a k-digit number on the basis of a preselected radix $2^n$, where n represents an integer used to represent the Mersenne number as $(2^n-1)$, as:

$$P = a_{k-1}(2^n)^{k-1} + a_{k-2}(2^n)^{k-2} + \ldots + a_2(2^n)^2 + a_1(2^n) + a_0,$$

where $a_{k-1}, a_{k-2}, \ldots, a_2, a_1$, and $a_0$ represent coefficients, each of which is not less than zero except for one thereof and is less than the preselected radix. The exceptional coefficient is not less than unity. The divider comprises first summing means, all-one detecting means, and second summing means.

The first summing means is for summing the coefficients $a_{k-1}, a_{k-2}, \ldots, a_2, a_1$, and $a_0$ to provide a sum given by a carry multiplied by the preselected radix plus a sum portion that is not less than zero and is less than the preselected radix, summing the carry and the sum portion to provide a similarly given sum, and repeating such a summing process a finite number of times until an eventual sum is similarly given, which is not less than zero and is less than the preselected radix.

Connected to the first summing means, the all-one detecting means is for examining whether or not the eventual sum is equal to the divisor. When the eventual sum is equal to the divisor, the all-one detecting means provides a zero as the remainder and provides also an additional carry equal to unity. Otherwise, the all-one detecting means provides the eventual sum as the remainder, with the additional carry rendered equal to zero.

Connected to the first summing means and the all-one detecting means, the second summing means is for summing $a_{k-1}(2^n)^{k-2}$, $(a_{k-1}+a_{k-2})(2^n)^{k-3}$, ..., $(a_{k-1}+a_{k-2}+\ldots+a_2)(2^n)$, and $(a_{k-1}+a_{k-2}+\ldots+a_2+a_1)$, all the carry given by the first summing means, and the additional carry to provide the quotient.

According to this invention, there is also provided a parallel processor system comprising a plurality of processors and a memory comprising, in turn, a plurality of memory modules assigned with inter-module addresses, respectively. Each of the memory modules comprises a plurality of memory cells allotted with intra-module addresses, respectively. The memory modules should be a Mersenne prime in number. Each of the processors comprises means for producing an address signal representative of a natural number at a time and accessing means responsive to the address signal for accessing a selected one of the memory cells of a selected one of the memory modules by dividing the natural number by the Mersenne prime to derive the intra-module address for the selected memory cell by the quotient and the inter-module address for the selected memory module by the remainder.

DESCRIPTION OF THE PREFERRED EMBODIMENTS

Before describing a divider according to the present invention, attention will be directed to division of a natural number P by a divisor M equal to a Mersenne number $(2^n-1)$, where the exponent n represent an integer greater than unity. For convenience of the division by the divisor M, the natural number P is herein represented on the basis of $2^n$, which is referred to as a preselected radix. The number of digits k is presumed to be an integer greater than unity. The natural number P is given without loss of generality by:

$$P = a_{k-1}(2^n)^{k-1} + a_{k-2}(2^n)^{k-2} + \ldots + a_i(2^n)^i + \ldots + a_2(2^n)^2 + a_1(2^n) + a_0, \quad (1)$$

where $a_i$'s $(0 \leq i \leq k-1)$ represent coefficients. Each of the coefficients $a_i$'s is not less than zero except for the coefficient for the highest-order term $a_{k-1}$, which should not be less than unity. Each coefficient $a_i$, which may be the coefficient $a_{k-1}$, is less than the preselected radix $2^n$. More particularly:

$$a_i = a_{(n-1)i} 2^{n-1} + a_{(n-2)i} 2^{n-2} + \ldots + a_{ji} 2^j + \ldots + a_{2i} 2^2 + a_{1i} 2 + a_{0i}, \quad (2)$$

where the coefficients $a_{ji}$'s $(0 \leq j \leq n-1)$ are equal to either 0 or 1 except for at least one of the coefficients $a_{j(k-1)}$'s that should be equal to unity. According to Equation (2), the divisor M is given by:

$$M = 2^{n-1} + 2^{n-2} + \ldots + 2^2 + 2 + 1.$$

It is possible to represent division by the divisor M of each term in the right side of Equation (1) by:

$$a_i(2^n)^i = M[a_i(2^n)^{i-1} + a_i(2^n)^{i-2} + \ldots + a_2(2^n)^2 + a_1(2^n) + a_i] + a_i, \quad (3)$$

where the second term $a_i$ in the right side represents a formal remainder, which becomes a true remainder only when the second term $a_i$ is less than the divisor M. Let the division of the natural number P by the divisor M be represented by:

$$P = MQ + R,$$

where Q represents a quotient given by a polynomial of the preselected radix $2^n$ and R, a remainder. By the use of Equation (3):

$$R = a_{k-1} + a_{k-2} + \ldots + a_2 + a_1 + a_0 \pmod{M} \quad (4)$$

and $$Q = a_{k-1}(2^n)^{k-2} + (a_{k-1} + a_{k-2})(2^n)^{k-3}$$

$$+ \ldots$$

$$+ (a_{k-1} + a_{k-2} + \ldots + a_i)(2^n)^{i-1}$$

$$+ \ldots$$

$$+ (a_{k-1} + a_{k-2} + \ldots + a_2)(2^n)$$

$$+ (a_{k-1} + a_{k-2} + \ldots + a_2 + a_1)$$

$$\rightarrow \lfloor (a_{k-1} + a_{k-2} + \ldots + a_2 + a_1 + a_0)/M \rfloor, \quad (5)$$

where a pair of operators "$\lfloor$" and "$\rfloor$" used in the last term represents the operation of finding a maximum integer that is not greater than the argument subjected to the operation.

For brevity of description, the coefficient for the power $(2^n)^{i-1}$ in the right side of Equation (5) will be denoted by $S_i$. When the coefficient $S_i$ is equal to or greater than the preselected radix $2^n$, a carry equal to unity or greater occurs. When the coefficient $S_i$ is less than the preselected radix $2^n$, it is possible to understand that the carry is equal to zero.

The numerator of a fraction in the last term will likewise be designated by $S_0$ and will be referred to merely as the numerator $S_0$. The last term represents an addend that results from calculation of the congruence relationship (4) and is to be included in the quotient Q as the coefficient for the zeroth and/or higher-order power of the preselected radix $2^n$. Attention will now be directed to the addend $\lfloor S_0/M \rfloor$ and the remainder R. The remainder R in certain cases will be reviewed later.

From the fact that at least one of the coefficients $a_i$'s is not less than unity as remarked in connection with Equation (1), it is obvious that the numerator $S_0$ is not less than unity. Inasmuch as each coefficient $a_i$ is less than the preselected radix $2^n$ or not greater than the divisor M, the numerator $S_0$ is not greater than k times the divisor kM. In other words, the numerator $S_0$ is not greater than k times the preselected radix $k(2^n)$ minus the number of digits k, namely, $(k(2^n) - k)$. If the numerator $S_0$ is less than the divisor M:

$$\lfloor S_0/M \rfloor = 0$$

and $$R = S_0,$$

with the result that no carry takes place. Stated otherwise, the addend $S_0/M$ provides a carry equal to zero. If the numerator $S_0$ is equal to the divisor M:

$$\lfloor S_0/M \rfloor = 1$$

$$R = 0,$$

with the result that the addend $\lfloor S_0/M \rfloor$ provides a carry equal to zero and an additional carry equal to unity. If the numerator $S_0$ is greater than the divisor M, the numerator $S_0$ is equal to the preselected radix $2^n$ or greater. It is therefore possible to rewrite:

$$S_0 = c_0(2^n) + s_0, \quad (6)$$

where $c_0$ represents a polynomial of the preselected radix $2^n$ and $s_0$, a number that is not less than zero and is less than the preselected radix $2^n$. The polynomial $c_0$ is not less than unity and not greater than the number of digits k of the natural number P less one, that is, $(k-1)$. The number $s_0$ is herein named a sum portion.

Applying the principles described in conjunction with Equation (3) to Equation (6), it is possible to formally write:

$$S_0 = c_0 M + (c_0 + s_0), \qquad (7)$$

where the second term $(c_0 + s_0)$ in the right side represents a formal remainder that is not less than zero and is less than a sum of the number of digits k less one and the preselected radix $2^n$, namely $(k - 1 + 2^n)$. If the second term $(c_0 + s_0)$ is less than the divisor M:

$$\lfloor S_0/M \rfloor = c_0 \qquad (8)$$

and $$R = c_0 + s_0, \qquad (8')$$

with the result that a carry equal to the polynomial $c_0$ should be included in the quotient Q. The remainder R will be described later. If the second term $(c_0 + s_0)$ is equal to the divisor M:

$$\lfloor S_0/M \rfloor = c_0 + 1 \qquad (9)$$

and $$R = 0,$$

so that the addend $\lfloor S_0/M \rfloor$ provides a carry equal to the polynomial $c_0$ and an additional carry equal to unity. Otherwise, the second term $(c_0 + s_0)$ is equal to the preselected radix $2^n$ or greater. It is therefore possible again to rewrite:

$$c_0 + s_0 = {}_1(2^n) + s_1, \qquad (10)$$

where $c_1$ represents a new polynomial of the preselected radix $2^n$ and $s_1$, a new sum portion that is not less than zero and is less than the preselected radix $2^n$. The new polynomial $c_1$ is not less than unity and not greater than the number of digits k divided by the preselected radix $2^n$ or $(k/2^n)$.

On the other hand, it is possible to formally write:

$$c_0 + s_0 = c_1 M + (c_1 + s_1),$$

where the new or once renewed second term $(c_1 + s_1)$ represents a number that is not less than zero and is less than a sum of the number of digits k divided by the preselected radix $2^n$ plus the preselected radix $2^n$, namely, $(k/2^n + 2^n)$.

It will now be presumed that the number of digits k is not greater than the preselected radix $2^n$. In this event, the new polynomial $c_1$ is equal to unity. The new second term $(c_1 + s_1)$ is not less than zero and is less than a sum of the preselected radix $2^n$ and one, that is, $(2^n + 1)$. Even when the exponent n is equal only to three, in which case the divisor M is equal to seven, a natural number P represented on the basis of a radix $2^3 (= 8)$ by eight digits may be as great as decimal 16,777,215.

If the once renewed second term $(c_1 + s_1)$ is less than the divisor M:

$$\lfloor S_0/M \rfloor = c_0 + c_1$$

and $$R = c_1 + s_1,$$

with the result that the addend $\lfloor S_0/M \rfloor$ provides a carry equal to a sum of the polynomials $c_0$ and $c_1$. The remainder R will be described below. If the new second term $(c_1 + s_1)$ is equal to the divisor M:

$$\lfloor S_0/M \rfloor = c_0 + c_1 + 1$$

and $$R = 0,$$

from which it is understood that the addend $\lfloor S_0/M \rfloor$ provides a carry equal to the sum of the polynomials $(c_0 + c_1)$ and an additional carry equal to unity. Otherwise, it is possible to further rewrite:

$$c_1 + s_1 = c_2(2^n) + s_2,$$

where $c_2$ represents again unity and $s_2$, still another sum portion that is now equal to zero. It is therefore understood that the twice renewed second term $(c_2 + s_2)$ is always less than the divisor M and can formally be given by an eventual sum of a carry multiplied by the preselected radix $2^n$ and yet another sum portion that is equal to zero, where the last-mentioned carry is equal to zero.

The concept of the eventual sum applies even to the numerator $S_0$ when the numerator $S_0$ is less than the preselected radix $2^n$, namely, not greater than the divisor M. Speaking of another example, the second term $(c_0 + s_0)$ used in Equation (7) provides an eventual sum when the second term $(c_0 + s_0)$ is less than the preselected radix $2^n$. If this eventual sum is equal to the divisor M, an additional carry equal to unity is added to the already calculated carry $c_0$ described in Equation (8) with the remainder R rendered equal to zero. If the eventual sum is not equal to the divisor M, the remainder R is given by the eventual sum as described in Equation (8') with the additional carry rendered equal to zero as implied by Equation (8).

The addend $\lfloor S_0/M \rfloor$ and the remainder R are therefore obtained by calculating at first the numerator $S_0$, dividing the numerator $S_0$ according to Equation (6) into a carry $c_0$ and a sum portion $s_0$ less than the preselected radix $2^n$, and calculating the second term $(c_0 + s_0)$ used in Equation (7). If the second term $(c_0 + s_0)$ is either equal to the preselected radix $2^n$ or greater, calculation of the addend $\lfloor S_0/M \rfloor$ and the remainder R is continued by dividing the second term $(c_0 + s_0)$ into another carry $c_1$ and another sum portion $s_1$ less than the preselected radix $2^n$ as described in Equation (10) and then calculating the once renewed second term $(c_1 + s_1)$. Only when the once renewed second term $(c_1 + s_1)$ is equal to the preselected radix $2^n$, calculation of the addend $\lfloor S_0/M \rfloor$ and the remainder R is further continued by dividing the once renewed second term $(c_1 + s_1)$ into still another carry $c_2$ and still another sum portion $s_2$. Inasmuch as the twice renewed second term $(c_2 + s_2)$ is now less than the divisor M, yet another carry becomes equal to zero when the twice renewed second term ($c_2+s_2$) were formally represented by an eventual sum of the last-mentioned carry multiplied by the preselected radix $2^n$ and yet another sum portion that is not less than zero and is less than the preselected radix $2^n$. The addend $\lfloor S_0/M \rfloor$ is given by all the carry $c_0$ as in Equation (8), ($c_0+c_1$), or ($c_0+c_1+c_2$) obtained before arrival at the eventual sum if the eventual sum is not equal to the divisor M. In this event, the remainder R is equal to the eventual sum as exemplified in Equation (8'). The addend $\lfloor S_0/M \rfloor$ is given by all the carry plus an additional sum equal to unity as exemplified in Equation (9) if the eventual sum is equal to the divisor M. In the latter event, the remainder R is equal to zero.

The above-described fact applies even when the number of digits k is greater than the preselected radix $2^n$. It is only necessary that the addition of carries should be repeated several times more as the case may be. The number of times of the carry addition, however, is of the order of $k/2^n+1$ at most. In other words, the remainder R and the addend $\lfloor S_0/M \rfloor$ are obtained by repeating such successive summing processes a finite number of times.

Figure 1:
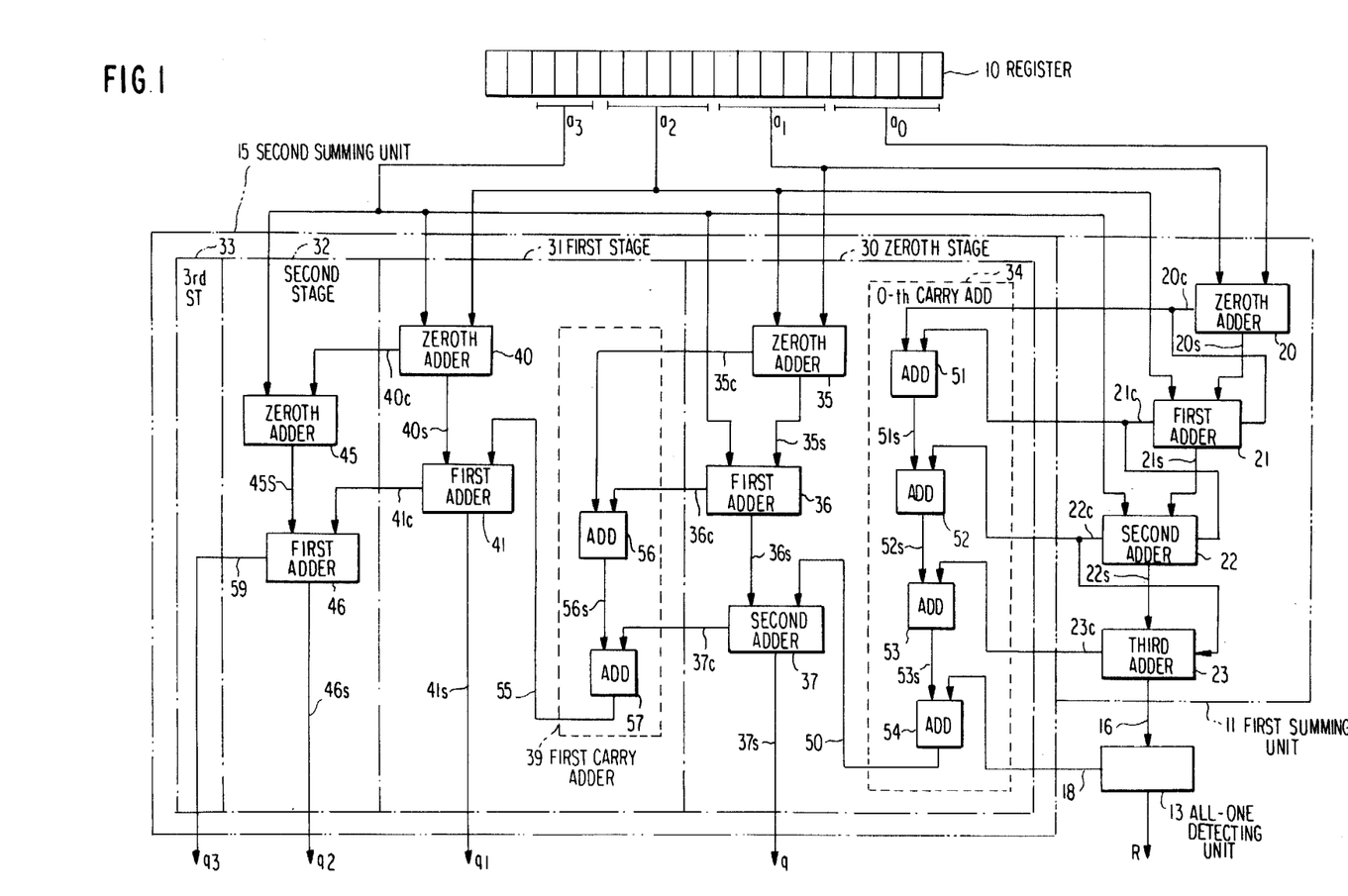
FIG. 1 is a block diagram of a divider according to a first embodiment of the instant invention and a register.

Referring now to FIG. 1, a divider according to a first embodiment of this invention is for a natural number P given on the basis of a preselected radix $2^n$ with four selected as the number of digits k used in Equation (1). In the embodiment being illustrated, the divisor M is assumed to be $2^4+2^3+2^2+2+1$ or 31 merely for convenience of description. The exponent n for the preselected radix $2^n$ should therefore be five.

The divider is for use in combination with a register 10 for registering the natural number P. It is assumed that the natural number P is of binary eighteen bits. Short lines depicted under the register 10 represent the coefficients $a_3$, $a_2$, $a_1$, and $a_0$ used in Equation (1). The divider comprises a first summing unit 11, an all-one detecting unit 13 connected to the first summing unit 11, and a second summing unit 15 connected to the first summing unit 11 and the all-one detecting unit 13.

As will later be described more in detail, the first summing unit 11 is for summing the coefficients $a_3$ through $a_0$ to provide a sum or the numerator $S_0$ described with reference to Equation (5). More specifically, the sum $S_0$ is given by a carry multiplied by the radix $2^5$ plus a sum portion that is not less than zero and is less than the radix $2^5$. The carry is added to the sum portion as described in conjunction with the second terms in the right sides of Equations (7) and so forth to provide a similarly given sum mentioned with reference to the right sides of Equations (10) and so on. The summing process is repeated a finite number of times until the similarly given sum becomes an eventual sum 16 that is not less than zero and is less than the radix $2^5$.

The all-one detecting unit 13 checks if the eventual sum 16 is coincident with the divisor M or not. If not, the eventual sum 16 is produced as the remainder R with an additional carry 18 rendered equal to zero. Otherwise, the additional carry 18 is turned to unity with a zero produced as the remainder R. It is readily possible to implement such an all-one detecting unit 13 by a five-input AND gate (not shown) responsive to the eventual sum 16 for producing the additional carry 18 and five two-input AND gates (not shown) for producing the remainder R, each supplied with the additional carry 18 as an inhibit input.

As will presently be detailed, the second summing unit 15 is for primarily calculating a sum of $a_3(2^5)^2$, ($a_3+a_2$)($2^5$), and ($a_3+a_2+a_1$) as described in the right side of Equation (5) except for the last term that was called the addend. The sum may be called a provisional quotient. All the carry given by the first summing unit 11 is added to the provisional quotient as described in connection with Equation (8) and others. The additional carry 18 is further added to the sum of the provisional quotient and all the carry as exemplified in Equation (9). The total sum provides the quotient Q according to Equation (5).

Referring more specifically to FIG. 1, the first summing unit 11 comprises zeroth through third adders 20, 21, 22, and 23. The zeroth adder 20 is for calculating a zeroth partial sum of a first and a second of the coefficients $a_3$ through $a_0$, such as the coefficients $a_1$ and $a_0$. The zeroth partial sum is given by a zeroth carry $20c$ multiplied by the radix $2^5$ plus a zeroth partial sum portion $20s$ that is not less than zero and is less than the radix $2^5$. The first adder 21 calculates a first partial sum of the zeroth partial sum portion $20s$, the zeroth carry $20c$, and a third of the coefficients $a_3$ through $a_0$ as, for example, the coefficient $a_2$. The first partial sum is again given by a first carry $21c$ multiplied by the radix $2^5$ plus a first partial sum portion $21s$ that is not less than zero and is less than the radix $2^5$. The second adder 22 calculates a second partial sum of the first partial sum portion $21s$, the first carry $21c$, and the remaining coefficient $a_3$. The second partial sum is given by a second carry $22c$ multiplied by the radix $2^5$ plus a second partial sum portion $22s$ that is not less than zero and is less than the radix $2^5$. The third adder 23 calculates a third partial sum of the second partial sum portion $22s$ and the second carry $22c$. The third partial sum is now given by a third carry $23c$ multiplied by the radix $2^5$ plus the eventual sum 16. It will readily be understood that the above-described calculation is equivalent to the calculation of the eventual sum 16 and all the carry $c_0$, $c_1$, and/or $c_2$ exemplified in Equation (8).

The second summing unit 15 comprises zeroth through third stages 30, 31, 32, and 33. Although depicted for convenience of the later description, the third stage 33 is unnecessary in the example being illustrated where the natural number P is given as an eighteen-digit binary number. The zeroth stage 30 comprises a zeroth carry adder 34 and zeroth through second zeroth-stage adders 35, 36, and 37. The first stage 31 comprises a first carry adder 39 and zeroth and first first-stage adders 40 and 41. The second stage 32 comprises zeroth and first second-stage adders 45 and 46.

The zeroth carry adder 34 is connected to the first summing unit 11 and the all-one detecting unit 13 and is for summing all the carry given by the first summing unit 11 and the additional carry 18 to provide a zeroth sum carry 50 as described in conjunction with Equations (8) and (9). In the example being illustrated, the zeroth carry adder 34 comprises an adder 51 for summing the zeroth and the first carries $20c$ and $21c$ to provide a sum $51s$, another adder 52 for summing the sum $51s$ and the second carry $22c$ to provide another sum $52s$, still another adder 53 for summing the other sum $52s$ and the third carry $23c$ to provide still another sum $53s$, and yet another adder 54 for summing the last-mentioned sum $53s$ and the additional carry 18 to provide the zeroth sum carry 50.

In the zeroth stage 30, the zeroth adder 35 is for calculating a zeroth zeroth-stage sum of a first and a second of the coefficients $a_3$ through $a_0$ except for the coefficient $a_0$, such as the coefficients $a_2$ and $a_1$. The zeroth zeroth-stage sum is given by a zeroth zeroth-stage carry 35c multiplied by the radix $2^5$ plus a zeroth zeroth-stage sum portion 35s that is not less than zero and is less than the radix $2^5$. The first adder 36 calculates a first zeroth-stage sum of the zeroth zeroth-stage sum portion 35s and the remaining coefficient $a_3$. The first zeroth-stage sum is given by a first zeroth-stage carry 36c multiplied by the radix $2^5$ plus a first zeroth-stage sum portion 36s that is not less than zero and is less than the radix $2^5$. The second adder 37 is for summing the first zeroth-stage sum portion 36s and the zeroth sum carry 50 to provide a sum of a second zeroth-stage carry 37c multiplied by the radix $2^5$ and a second zeroth-stage sum portion 37s that is not less than zero and is less than the radix $2^5$.

The first carry adder 39 is for summing the zeroth through the second zeroth-stage carries 35c, 36c, and 37c to provide a first sum carry 55. As is the case with the zeroth carry adder 34, the first carry adder 39 may comprise an adder 56 for summing the zeroth and the first zeroth-stage carries 35c and 36c to provide a sum 56s and another adder 57 for summing the sum 56s and the second zeroth-stage carry 37c into the first sum carry 55.

In the first stage 31, the zeroth adder 40 is for calculating a zeroth first-stage sum of the coefficients $a_3$ and $a_2$, namely, the coefficients $a_3$ through $a_0$ except for the coefficients $a_0$ and $a_1$. The zeroth first-stage sum is given by a zeroth first-stage carry 40c multiplied by the radix $2^5$ plus a zeroth first-stage sum portion 40s that is not less than zero and is less than the radix $2^5$. The first adder 41 is for summing the zeroth first-stage sum portion 40s and the first sum carry 55 into a first first-stage carry 41c multiplied by the radix $2^5$ plus a first first-stage sum portion 41s that is not less than zero and is less than the radix $2^5$.

In the second stage 32, the zeroth adder 45 is for calculating a zeroth second-stage sum 45S of the coefficient $a_0$ and the zeroth first-stage carry 40c. The first adder 46 is for summing the zeroth second-stage sum 45S and the first first-stage carry 41c to provide a sum of a second-stage carry or second sum carry 59 multiplied by the radix $2^5$ and a first second-stage sum portion 46s that is not less than zero and is less than the radix $2^5$. It will readily be understood that the second stage 32 is equivalent in structure to either of the zeroth and the first stages 30 and 31. When the natural number P is of binary eighteen bits at most, the second-stage carry 59 is always equal to zero. It is unnecessary to take the second-stage carry 59 into consideration. Even if comprised, the third stage 33 is merely for transmitting the second-stage carry 59.

The third stage 33, the first second-stage adder 46, the first first-stage adder 41, and the second zeroth-stage adder 37 produce the second-stage carry 59, the first second-stage sum portion 46s, the first first-stage sum portion 41s, and the second zeroth-stage sum portion 37s as third, second, first, and zeroth coefficients $q_3$, $q_2$, $q_1$, and $q_0$, respectively, of the third through the zeroth powers of the radix $2^5$ in a polynomial representative of the quotient Q. In other words, the quotient Q is obtained as:

$$Q = q_3(2^5)^3 + q_2(2^5)^2 + q_1(2^5) + q_0.$$

Reviewing the divider illustrated with reference to FIG. 1, the remainder R is obtained at first in the first summing unit 11 combined with the all-one detecting unit 13 by the use of the zeroth through the third adders 20 to 23, namely, four five-bit adder stages. When the adders 20 through 23 and the AND gates of the all-one detecting unit 13 are composed of ECL's (emitter coupled logics), it takes only about twenty nanoseconds to obtain the remainder R. The quotient Q is subsequently obtained in the second summing unit 15 by the use of at most ten adder stages. Even in the worst case as regards the time consumed, only about fifty nanoseconds are necessary. The total is about seventy nanoseconds. In contrast, it is unavoidable according to the prior art to carry out subtraction of eighteen-bit binary number thirteen times with shifts carried out also thirteen times in the worst case. It takes therefore at least two hundred nanoseconds to obtained the quotient Q at first and then the remainder R. The divider according to this invention comprises accordingly less hardware.

As pointed out in connection with the second stage 32 of the second summing unit 15, it is possible to make each stage produce the carry only from the last adder, such as 37, in that stage. The carry adder 39 comprised by the next stage in the illustration becomes unnecessary although six-or-more-bit adders are indispensable. Under the circumstances, it is more convenient to understand that an equivalent of each carry adder, but for the zeroth-stage carry adder 34, is included in the prior stage. The zeroth stage 30, except for the carry adder 34, is now for calculating a zeroth-stage sum of the sum carry 50 and the coefficients $a_3$ through $a_1$. The zeroth-stage sum is given as a sum of a "zeroth-stage" carry 55 multiplied by the radix $2^5$ and a zeroth-stage sum portion 37s that is not less than zero and is less than the radix $2^5$. The first stage 31 is for calculating a first-stage sum of the zeroth-stage carry 55 and the coefficients $a_3$ and $a_2$. The first-stage sum is given as a sum of a first-stage carry, namely, a sum of the first-stage carries 40c and 41c, multiplied by the radix $2^5$ and a first-stage sum portion 41s that is not less than zero and is less than the radix $2^5$.

Although described only as regards the coefficients $a_3$ through $a_0$, the commutative law equally well applies to addition of the zeroth and the first sum carries or zeroth-stage and first-stage carries 50 and 55 to the sum of the coefficients $a_3$ through $a_1$ and the other sum of the coefficients $a_3$ and $a_2$, respectively. For example, it is possible to calculate a sum of the zeroth-stage carry 50 and one of the coefficients $a_3$ through $a_1$ at first by the zeroth zeroth-stage adder 35. Supply of the sum carry 50 to the last adder 37 is, however, desirable in order to raise the speed of addition.

Even when the natural number P is of binary twenty digits, the third coefficient $q_3$ for the quotient Q is kept zero for most dividends. It is therefore possible to make the first second-stage adder 46 produce the first second-stage sum directly as the second coefficient $q_2$ with which the third coefficient $q_3$ is combined as the case may be.

The same circuit scheme is applicable to the cases where the number of digits k of the natural number P is four irrespective of selection of the divisor M and consequently the exponent n for the preselected radix $2^n$. It is only necessary that the number of stages of the register 10 for each coefficient $a_i$ and the number of bits of each adders 20–23, 35–37, 40–41, and 45–46 should be increased when six or more is selected as the exponent n for the divisor M given as ($2^n - 1$) and accordingly for the natural number P.

A few numerical examples will now be described with three selected as the exponent n common to the divisor M or $(2^n-1)$ and the radix $2^n$ for the natural number P given as the dividend. The divisor M is now a Mersenne prime equal to seven. For a short while, numbers will be represented in the binary system unless otherwise specified.

When 101000111110 (decimal 2622) is selected as the natural number P, the numerator $S_0$ is given by $101+000+111+110$ as 10010. The addend $\lfloor S_0/M \rfloor$ is given as a carry equal to 10. The eventual sum becomes equal to $010+10$, namely, 100 (decimal 4). The additional carry is rendered equal to zero. The zeroth coefficient $q_0$ is calculated according to $101+000+111+10$ as 1110, in which the most significant digit 1 serves as a carry to the first coefficient $q_1$. The zeroth coefficient $q_0$ is therefore given by three lower digits 110. The first coefficient $q_1$ is equal to $101+000+1$, namely, 110. The carry to the second coefficient $q_2$ is equal to 0. The second coefficient $q_2$ is now given by $101+0=101$. The quotient Q is therefore equal to 101110110 (decimal 374).

When the natural number P is 101011111000 (decimal 2808), the numerator $S_0$ is given by $101+011+111+000$ as 1111. When the carry 1 given by the most significant digit is added to the sum portion 111, the result of addition $111+1$ is equal to 1000, which is not yet an eventual sum. The new carry 1 is again added to the new sum portion 000, thus 000 plus 1, which now gives an eventual sum as 001. The remainder R is given by 001 (decimal 1). The addend $\lfloor S_0/M \rfloor$ or zeroth sum carry is calculated by $1+1=10$. The zeroth coefficient $q_0$ is given by $101+011+111+10$ as 10001, in which only three lower digits 001 give the zeroth coefficient $q_0$. The higher digits 10 are carried to the first coefficient $q_1$, which is calculated by $101+011+10$ as 1010. A carry equal to unity appears for the second coefficient $q_2$. The first coefficient $q_1$ is equal to 010. The second coefficient $q_2$ is given by $101+1$ as 110. The quotient Q is equal to 110010001 (decimal 401).

For the case where 111011110111 (decimal 3831) is used as the natural number P, the numerator $S_0$ is given by $111+011+110+111$ as 10111. When the carry 10 is added to the sum portion 111, the result of addition $111+10$ is equal to 1001. Addition is repeated to give $001+1=010$ (decimal 2) as an eventual sum and consequently as the remainder R. The zeroth sum carry is given by $10+1$ as 11. The zeroth coefficient $q_0$ is calculated by $111+011+110+11$ as 10011, in which only three lower digits 011 give the zeroth coefficient $q_0$. A carry equal to 10 should be taken into consideration on calculating the first coefficient $q_1$. Therefore, $111+011+10=1100$ gives the first coefficient $q_1$ with only three lower digits 100. The most significant digit 1 is carried to the second coefficient $q_2$ as a carry equal to unity. The second coefficient $q_2$ is given by $111+1$ as 1000, in which the most significant digit 1 given the third coefficient $q_3$ and the three less significant digits 000, the second coefficient $q_2$. The quotient Q is therefore given by 1000100011 (decimal 547).

The divider illustrated with reference to FIG. 1 is operable without any modification even when the number of digits k is less than four provided that the exponent for the divisor M or $(2^n-1)$ and for the preselected radix $2^n$ is not greater than five. It will now be obvious to implement a divider operable when the number of digits k is greater than five.

Generally speaking, a divider for dividing by a Mersenne number a natural number P given as in Equation (1) is implemented as follows. As depicted in FIG. 1, the divider should comprise a first summing unit 11, an all-one detecting unit 13 connected to the first summing unit 11, and a second summing unit 15 connected to the first summing unit 11 and the all-one detecting unit 13. The units 11, 13, and 15 should be operable as specified above.

The first summing unit 11 may comprise zeroth through $(k-1)$-th adders. It is possible to understand that the zeroth and the $(k-1)$-th adders are shown in FIG. 1 at 20 and 23, respectively. The zeroth adder is for calculating a sum of a first and a second of the coefficients $a_{k-1}$ through $a_0$. The sum is herein referred to as a zeroth partial sum and is given as a sum of a zeroth carry multiplied by the preselected radix $2^n$ and a zeroth partial sum portion that is not less than zero and is less than the preselected radix $2^n$. The first adder is for calculating a first partial sum of the zeroth partial sum portion, the zeroth carry, and a third of the coefficients $a_{k-1}$ through $a_0$. Like the zeroth partial sum, the first partial sum is given as a sum of a first carry multiplied by the preselected radix $2^n$ and a first partial sum portion that is not less than zero and is less than the preselected radix $2^n$.

In this manner, the $(k-2)$-th adder is for calculating a $(k-2)$-th partial sum of a $(k-3)$-th partial sum portion, a $(k-3)$-th carry, and a $(k-1)$-th or the remaining one of the coefficients $a_{k-1}$ through $a_0$. The $(k-3)$-th partial sum portion and the $(k-3)$-th carry are given by the $(k-3)$-th adder like the first partial sum portion and the first carry, respectively. The $(k-2)$-th partial sum is given as a sum of a $(k-2)$-th carry multiplied by the preselected radix $2^n$ and a $(k-2)$-th partial sum portion that is not less than zero and is less than the preselected radix $2^n$. It is possible to understand that the $(k-3)$-th and the $(k-2)$-th adders are illustrated in FIG. 1 at 21 and 22, respectively. In other words, the $(k-3)$-th adder is the first adder 21 when the number of digits k is equal to four.

The $(k-1)$-th adder is for calculating a $(k-1)$-th partial sum of the $(k-2)$-th partial sum portion and the $(k-2)$-th carry. The $(k-1)$-th partial sum is given as a sum of a $(k-1)$-th carry multiplied by the preselected radix $2^n$ and the above-described eventual sum 16. It is therefore possible to provide the remainder R by the all-one detecting unit 13 of the type described, which also gives the above-mentioned additional carry 18 equal to either 0 or 1.

The second summing unit 15 may comprise zeroth through $(k-1)$-th stages and a carry adder 34, which is referred to as the zeroth carry adder hereinabove. It is possible to understand that the zeroth and the $(k-1)$-th stages are shown in FIG. 1 at 30 and 33, respectively, and that the zeroth stage 30 does not include the carry adder 34 but instead the "first" carry adder 39 either separately from the adder or adders of that stage as in the example illustrated with reference to FIG. 1 or as parts of the adder or adders as has already been described. The $(k-3)$-th and the $(k-2)$-th stages included in the zeroth through the $(k-1)$-th stages, as will shortly be described, correspond to the stages 31 and 32, respectively.

The carry adder 34 is connected to the first summing unit 11 and the all-one detecting unit 13 and is for summing all the carry given by the first summing unit 11 and the additional carry 18 to provide a sum carry 50.

The zeroth stage is for calculating a zeroth-stage sum of the sum carry 50 and the coefficients $a_3$ through $a_1$, (k−1−0) in number. The zeroth-stage sum is given as a sum of a zeroth-stage carry 55 multiplied by the preselected radix $2^n$ and a zeroth-stage sum portion, such as 37s, that is not less than zero and is less than the preselected radix $2^n$.

The (k−2)-th stage is for calculating a (k−2)-th-stage sum of a (k−3)-th-stage carry and the coefficient $a_{k-1}$, (k−1−[k−2]) in number. The (k−2)-th-stage sum is given as a sum of a (k−2)-th-stage carry, such as 59, multiplied by the preselected radix $2^n$ and a (k−2)-th-stage sum portion, such as 46s, that is not less than zero and is less than the preselected radix $2^n$. Herein, the (k−3)-th-stage carry, which corresponds to a sum of the first-stage carries 40c and 41c, is given by the (k−3)-th stage like either of the zeroth-stage and the (k−2)-th-stage carries 55 and 59. In other words, the (k−3)-th-stage carry gives a (k−3)-th-stage sum when multiplied by the preselected radix $2^n$ and added to a (k−3)-th-stage sum portion that is not less than zero and is less than the preselected radix $2^n$.

The (k−1)-th stage comprises a mere transmission line for transmitting the (k−2)-th-stage carry.

The zeroth through the (k−1)-th stages produce the zeroth-stage through the (k−2)-th-stage sum portions and the (k−2)-th-stage carry as zeroth through (k−1)-th coefficients $q_0, q_1$, and so forth for the zeroth through the (k−1)-th powers of the preselected radix $2^n$ in a polynominal representative of the quotient Q.

Figure 2:
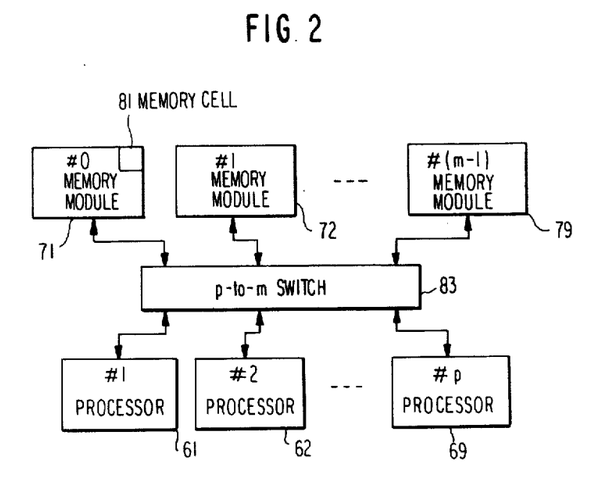
FIG. 2 is a block diagram of a parallel processor system to which an aspect of this invention is applicable.

Turning to FIG. 2, a parallel processor system comprises a plurality of processors 61, 62, ..., and 69, p in number, and a memory comprising, in turn, a plurality of memory modules 71, 72, ..., and 79, m is number, assigned with inter-module addresses, respectively. Each memory module comprises a plurality of memory cells, such as 81, allotted with intra-module addresses, respectively. The memory cells are for storing data for use in data processing. The number of memory cells in one of the memory modules 71 through 79 and that in another of the memory modules 71 through 79 need not be equal to each other. The processors 61 through 69 are capable of simultaneously carrying out the data processing by accessing different memory cells in one or a plurality of memory modules 71 to 79 through a memory switch 83 that may be a p-to-m switch. It will be assumed in the following that the number m of the memory modules 71 through 79 is a prime number because this is preferable as described hereinabove.

Figure 3:
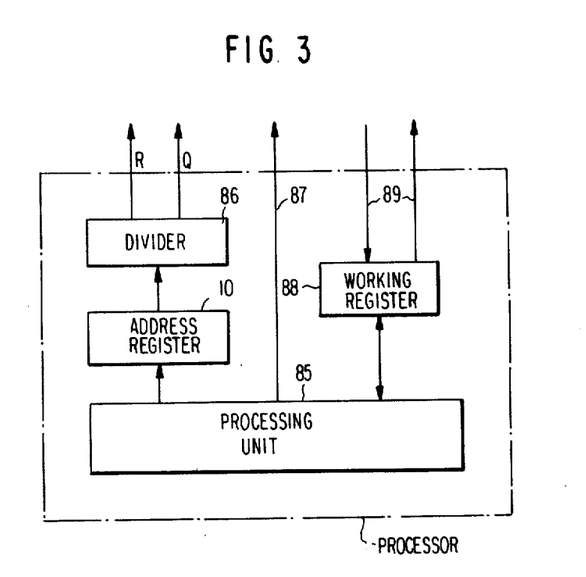
FIG. 3 is a block diagram of a processor for use in a parallel processor system according to a second embodiment of this invention.

Referring to FIG. 3, each processor comprises a processing unit 85 in which programs are stored. Responsive to the program being processed, the processing unit 85 produces an address signal, which is representative of a natural number P at a time and is temporarily stored in an address register 10. The reference numeral "10" is again used for the address register because it is possible to use the address register as the register 10 described in conjunction with FIG. 1 as will shortly become clear.

It is preferred that the natural number P be processed by a divider 86. With the divider 86, the natural number P is divided by the number m of the memory modules 71 to 79 (FIG. 2) to provide a quotient Q and a remainder R. The remainder R is equal to one of the integers 0 through (m−1). It is therefore possible to specify by the remainder R one of the memory modules 71 through 79 to which the integer equal to the remainder R is assigned as the inter-module address. A signal representative of the remainder R is sent through a connection R (the same reference letter being used merely for convenience) to one of the terminals of the p-to-m switch 83 (FIG. 2) that is associated with the processor being considered. The quotient Q is used in accessing one of the memory cells of the accessed memory module to which the integer equal to the quotient Q is allotted as the intra-module address. A signal representative of the quotient Q is supplied to the accessed memory module through a connection Q (the same reference letter being used) and the terminal of the p-to-m switch associated with the processor under consideration.

The processing unit 85 produces a control signal through a connection 87 for controlling read-out and write-in of the accessed memory cell through the p-to-m switch. The datum read out of the memory cell is supplied back to a working register 88 or the like through an input line of a data bus 89. Alternatively, the datum generated by the processing unit 85 as a result of the data processing and stored in the working register 88 is written in the accessed memory cell through an output line of the data bus 89 and the p-to-m switch.

It is urgently required that the divider 86 should speedily carry out the division despite the fact that the divisor is a prime number. According to an aspect of this invention, ther is already provided a divider (FIG. 1) for very speedily dividing a natural number P by a Mersenne number M to provide a quotient Q and a remainder R. A Mersenne prime is therefore selected in a parallel processor system according to another aspect of this invention, as the number m of the memory modules 71 through 79. This renders the access time of the memory cell very short. Furthermore, it is possible that a divider according to this invention to provide the remainder R at first and then the quotient Q. This makes it possible to select a desired memory cell after access is already had to a desired memory module comprising the desired memory cell. This results in an unexpectedly short access time.

A processor for use in a parallel processor system according to a second embodiment of this invention therefore comprises, as depicted in FIGS. 2 and 3, a divider 86 of any one of the types illustrated with reference to FIG. 1. It is usually sufficient that the number of digits k of the natural number P be four when the natural number P is given on the basis of a certain radix $2^n$ where n represents an exponent used in representing the Mersenne prime by $(2^n-1)$.

While this invention has so far been described in specific conjunction with a few preferred embodiments and modifications thereof, it will now be readily possible for those skilled in the art to carry this invention into effect in various other ways. For example, a "carry look ahead" facility may be resorted to in a divider illustrated with reference to FIG. 1. In the parallel processor system described in connection with FIGS. 2 and 3, the number of memory modules m need not be greater than the number of processors p.

What is claimed is:

1. A divider for dividing a natural number P by a Mersenne number to provide a quotient and a remainder, said natural number P being given by a k-digit number on the basis of a preselected radix $2^n$, where n represents an integer that is greater than unity and is used to represent said Mersenne number as $(2^n-1)$, as:

$$P = a_{k-1}(2^n)^{k-1} + a_{k-2}(2^n)^{k-2} + \ldots + a_2(2^n)^2 + a_1(2^n) + a_0,$$

where $a_{k-1}, a_{k-2}, \ldots, a_2, a_1$, and $a_0$ represent coefficients, each of said coefficients being not less than zero and being less than said preselected radix, at least one of said coefficients being not less than unity, said divider comprising:

first summing means for summing said coefficients $a_{k-1}, a_{k-2}, \ldots, a_2, a_1$, and $a_0$ to provide an eventual sum which is not less than zero and is less than said preselected radix, said first summing means comprising a plurality of adders connected in cascade, each of said adders providing a sum given by a carry multiplied by said preselected radix and a sum portion that is not less than zero and is less than said preselected radix, the last adder providing said eventual sum;

all-one detecting means connected to said first summing means for examining whether or not said eventual sum is equal to said divisor, to provide a zero as said remainder and an additional carry equal to unity when said eventual sum is equal to said divisor and to otherwise provide said eventual sum as said remainder with said additional carry rendered equal to zero; and second summing means connected to said first summing means and said all-one detecting means for summing $a_{k-1}(2^n)^{k-2} + (a_{k-1}+a_{k-2})(2^n)^{k-3} + \ldots + (a_{k-1}+a_{k-2}+\ldots+a_2)(2^n) + (a_{k-1}+a_{k-2}+\ldots+a_2+a_1)$, all the carry given by said first summing means, and said additional carry to provide said quotient.

2. A divider as claimed in claim 1, wherein said first summing means comprises zeroth through $(k-1)$-th adders, said zeroth adder being for calculating a zeroth partial sum of a first and a second of said coefficients with said zeroth partial sum given as a sum of a zeroth carry multiplied by said preselected radix and a zeroth partial sum portion that is not less than zero and is less than said preselected radix, the first adder being for calculating a first partial sum of said zeroth partial sum portion, said zeroth carry, and a third of said coefficients with said first partial sum given as a sum of a first carry multiplied by said preselected radix and a first partial sum portion that is not less than zero and is less than said preselected radix, the $(k-2)$-th adder being for calculating a $(k-2)$-th partial sum of a $(k-3)$-th partial sum portion, a $(k-3)$-th carry, and a k-th of said coefficients with said $(k-2)$-th partial sum given as a sum of a $(k-2)$-th carry multiplied by said preselected radix and a $(k-2)$-th partial sum portion that is not less than zero and is less than said preselected radix, said $(k-3)$-th partial sum portion and said $(k-3)$-th carry being given by the $(k-3)$-th adder like said first partial sum portion and said first carry, respectively, said $(k-1)$-th adder being for calculating a $(k-1)$-th partial sum of said $(k-2)$-th partial sum portion and said $(k-2)$-th carry with said $(k-1)$-th partial sum given as a sum of a $(k-1)$-th carry multiplied by said preselected radix and said eventual sum, all the carry set forth in claim 1 being given by said zeroth through said $(k-1)$-th carries.

3. A divider as claimed in claims 1 or 2, wherein said second summing means comprises zeroth through $(k-1)$-th stages and a carry adder, said carry adder being connected to said first summing means and said all-one detecting means for summing all the carry given by said first summing means and said additional carry to provide a sum carry, said zeroth stage being for calculating a zeroth-stage sum of said sum carry and said coefficients except for the coefficient $a_0$, $(k-1-0)$ in number, with said zeroth-stage sum given as a sum of a zeroth-stage carry multiplied by said preselected radix and a zeroth-stage sum portion that is not less than zero and is less than said preselected radix, the $(k-2)$-th stage being for calculating a $(k-2)$-th-stage sum of a $(k-3)$-th-stage carry and the coefficient $a_{k-1}$, $(k-1-[k-2])$ in number, with said $(k-2)$-th-stage sum given as a sum of a $(k-2)$-th-stage carry multiplied by said preselected radix and a $(k-2)$-th-stage sum portion that is not less than zero and is less than said preselected radix, said $(k-3)$-th-stage carry being given by the $(k-3)$-th stage like either of said zeroth-stage and said $(k-2)$-th-stage carries, said $(k-1)$-th stage comprising transmitting means for transmitting said $(k-2)$-th-stage carry, said zeroth through said $(k-1)$-th stages thereby producing said zeroth-stage through said $(k-2)$-th-stage sum portions and said $(k-2)$-th-stage carry as zeroth through $(k-1)$-th coefficients for the zeroth through the $(k-1)$-th powers of said preselected radix in a polynominal representative of said quotient.

4. A parallel processor system comprising a plurality of processors and a memory comprising, in turn, a plurality of memory modules assigned with inter-module addresses, respectively, each memory module comprising a plurality of memory cells allotted with intra-module addresses, respectively, said memory modules being a Mersenne prime in number, each of said processors comprising means for producing an address signal representative of a natural number at a time and accessing means responsive to said address signal for accessing a selected one of the memory cells of a selected one of said memory modules by dividing said natural number by said Mersenne prime to provide a quotient and a remainder, which give the intra-module address for the selected memory call and the inter-module address for the selected memory module, respectively.

5. A parallel processor system as claimed in claim 4, wherein said accessing means comprises:

a divider for which the natural number P and the Mersenne number are given by the natural number represented by said address signal and said Mersenne prime, respectively; and means responsive to said remainder and said quotient derived by said divider for accessing said selected memory module and said selected memory cell, respectively.

6. A parallel processor system as claimed in claim 5, wherein four is selected as the number of digits k of the natural number P.

7. A parallel processor system as claimed in claim 5, wherein the number P is given by a k-digit number on the basis of a preselected radix $2^n$, where n represents an integer that is greater than unity and is used to represent said Mersenne number as $(2^n-1)$, as:

$$P = a_{k-1}(2^n)^{k-1} + a_{k-2}(2^n)^{k-2} + \ldots + a_2(2^n)^2 + a_1(2^n) + a_0,$$

where $a_{k-1}, a_{k-2}, \ldots, a_2, a_1$, and $a_0$ represent coefficients, each of said coefficients being not less than zero and being less than said preselected radix, at least one of said coefficients being not less than unity, said divider comprising:

first summing means for summing said coefficients $a_{k-1}, a_{k-2}, \ldots, a_2, a_1$, and $a_0$ to provide an eventual sum which is not less than zero and is less than said preselected radix, said first summing means comprising a plurality of adders connected in cascade, each of said adders providing a sum given by a carry multiplied by said preselected radix and a sum portion that is not less than zero and is less than said preselected radix, the last adder providing said eventual sum;

all-one detecting means connected to said first summing means for examining whether or not said eventual sum is equal to said divisor, to provide a zero as said remainder and an additional carry equal to unity when said eventual sum is equal to said divisor and to otherwise provide said eventual sum as said remainder with said additional carry rendered equal to zero; and second summing means connected to said first summing means and said all-one detecting means for summing $a_{k-1}(2^n)^{k-2} + (a_{k-1}+a_{k-2})(2^n)^{k-3} + \ldots + (a_{k-1}+a_{k-2}+ \ldots +a_2)(2^n) + (a_{k-1}+a_{k-2}+ \ldots +a_2+a_1)$, all the carry given by said first summing means, and said additional carry to provide said quotient.

8. A parallel processor system as claimed in claim 6, wherein said first summing means comprises zeroth through third adders, said zeroth adder being for calculating a zeroth partial sum of a first and a second of said coefficients $a_3$ through $a_0$ with said zeroth partial sum given as a sum of a zeroth carry multiplied by said preselected radix and a zeroth partial sum portion that is not less than zero and is less than said preselected radix, the first adder being for calculating a first partial sum of said zeroth partial sum portion, said zeroth carry, and a third of said coefficients $a_3$ through $a_0$ with said first partial sum given as a sum of a first carry multiplied by said preselected radix and a first partial sum portion that is not less than zero and is less than said preselected radix, the second adder being for calculating a second partial sum of said first partial sum portion, said first carry, and the remaining one of said coefficients $a_3$ through $a_0$ with said second partial sum given as a sum of a second carry multiplied by said preselected radix and a second partial sum portion that is not less than zero and is less than said preselected radix, said third adder being for calculating a third partial sum of said second partial sum portion and said second carry with said third partial sum given as a sum of a third carry multiplied by said preselected radix and said eventual sum, all the carry set forth in claim 1 being given by said zeroth through said third carries.

9. A parallel processor system as claimed in claims 7 or 8, wherein said second summing means comprises zeroth through third stages and a carry adder, said carry adder being connected to said first summing means and said all-one detecting means for summing all the carry given by said first summing means and said additional carry to provide a sum carry, said zeroth stage being for calculating a zeroth-stage sum of said sum carry and the coefficients $a_3$ through $a_1$ with said zeroth-stage sum given as a sum of a zeroth-stage carry multiplied by said preselected radix and a zeroth-stage sum portion that is not less than zero and is less than said preselected radix, the first stage being for calculating a first-stage sum of said zeroth-stage carry and the coefficients $a_3$ and $a_2$ with said first-stage sum given as a sum of a first-stage carry multiplied by said preselected radix and a first-stage sum portion that is not less than zero and is less than said preselected radix, the second stage being for calculating a second-stage sum of said first-stage carry and the coefficient $a_3$ with said second-stage sum given as a sum of a second-stage carry multiplied by said preselected radix and a second-stage sum portion that is not less than zero and is less than said preselected radix, said third stage being for transmitting said second-stage carry, said zeroth through said third stages thereby producing said zeroth-stage through second-stage sum portions and said second-stage carry as zeroth through third coefficients for the zeroth through the third powers of said preselected radix in a polynomial representative of said quotient.

10. A parallel processor system as claimed in claim 9, wherein:

said zeroth stage comprises zeroth through second zeroth-stage adders and a zeroth-stage carry adder, said zeroth zeroth-stage adder being for calculating a zeroth zeroth-stage partial sum of a first and a second of the coefficients $a_3$ through $a_1$ with said zeroth zeroth-stage partial sum given as a sum of a zeroth zeroth-stage carry multiplied by said preselected radix and a zeroth zeroth-stage partial sum portion that is not less than zero and is less than said preselected radix, the first zeroth-stage adder being for calculating a first zeroth-stage partial sum of said zeroth zeroth-stage partial sum portion and the remaining one of the coefficients $a_3$ through $a_1$ with said first zeroth-stage partial sum given as a sum of a first zeroth-stage carry multiplied by said preselected radix and a first zeroth-stage partial sum portion that is not less than zero and is less than said preselected radix, said second zeroth-stage adder being for calculating a second zeroth-stage partial sum of said first zeroth-stage partial sum portion and said sum carry with said second zeroth-stage partial sum given as a sum of a second zeroth-stage carry multiplied by said preselected radix and said zeroth-stage sum portion, said zeroth-stage carry adder being for summing said zeroth through said second zeroth-stage carries into the zeroth-stage carry set forth in claim 9;

the first stage comprising a zeroth and a first first-stage adder, said zeroth first-stage adder being for calculating a zeroth first-stage partial sum of the coefficients $a_3$ and $a_2$ with said zeroth first-stage partial sum given as a sum of a zeroth first-stage carry multiplied by said preselected radix and a zeroth first-stage partial sum portion that is not less than zero and is less than said preselected radix, said first first-stage adder being for calculating a first first-stage partial sum of said zeroth first-stage partial sum portion and the zeroth-stage carry given by said zeroth-stage carry adder with said first first-stage partial sum given as a sum of a first first-stage carry multiplied by said preselected radix and said first-stage sum portion;

the second stage comprising a zeroth and a first second-stage adder, said zeroth second-stage adder being for calculating a zeroth second-stage partial sum of the coefficient $a_3$ and said zeroth first-stage carry, said first second-stage adder being for calculating a first second-stage partial sum of said zeroth second-stage partial sum and said first first-stage carry with said first second-stage partial sum given as a sum of said second-stage carry and said second-stage sum portion.

* * * * *

UNITED STATES PATENT AND TRADEMARK OFFICE
CERTIFICATE OF CORRECTION

PATENT NO. : 4,334,285

DATED : June 8, 1982

INVENTOR(S) : Kenji KAWAKITA

It is certified that error appears in the above—identified patent and that said Letters Patent is hereby corrected as shown below:

IN THE ABSTRACT:

At the end of the first formula, change " $+a_Q.$ " to -- $+a_0.$ --.

Column 1, line 16, change "n" to -- $\underline{n}$ --;
         line 18, change "n" to -- $\underline{n}$ --;
         line 31, change "g" to -- $\underline{q}$ --;
         line 32, change "r" (first occurrence) to -- $\underline{r}$ --;
         line 33, change "carries" to -- carried --;

Column 2, line 14, change "n" to -- $\underline{n}$ --;

Column 3, line 17, change "n" to -- $\underline{n}$ --;
         line 21, change "k" to -- $\underline{k}$ --;

Column 4, line 38, change "k" to -- $\underline{k}$ --;
         line 40, change "k" to -- $\underline{k}$ --;
         line 41, change "k" to -- $\underline{k}$ --;

Column 5, line 3, change "k" to -- $\underline{k}$ --;
         line 13, change "k" to -- $\underline{k}$ --;
         line 14, change "namely" to -- namely, --;
         line 41, change figure (10) from " $c_0 + s_0 =_1 (2^n) + s_1,$ " to -- $c_0 + s_0 = c_1 (2^n) + s_1,$ --;

UNITED STATES PATENT AND TRADEMARK OFFICE
CERTIFICATE OF CORRECTION

PATENT NO. : 4,334,285
DATED : June 8, 1982
INVENTOR(S) : Kenji KAWAKITA

It is certified that error appears in the above—identified patent and that said Letters Patent is hereby corrected as shown below:

Column 5, line 47, change "k" to -- $\underline{k}$ --;
           line 55, change "k" to -- $\underline{k}$ --;
           line 58, change "k" to -- $\underline{k}$ --;
           line 63, change "n" to -- $\underline{n}$ --;

Column 7, line 15, change "k" to -- $\underline{k}$ --;
           line 26, change "k" to -- $\underline{k}$ --;
           line 29, change "n" to -- $\underline{n}$ --;
           line 68, change " $(a_3+a_2)(2^5)$, " to -- $(a_3+a_3)(2^5)$, --

Column 10, line 13, change "obtained" to -- obtain --;
           line 58, change "k" to -- $\underline{k}$ --;
           line 60, change "n" to -- $\underline{n}$ --;
           line 65, change "n" to -- $\underline{n}$ --;
           line 68, change "n" to -- $\underline{n}$ --;

Column 11, line 62, change "k" to -- $\underline{k}$ --;
           line 66, change "k" to -- $\underline{k}$ --;

Column 12, line 38, change "k" to -- $\underline{k}$ --;

Column 13, line 30, change "p" to -- $\underline{p}$ --;
           line 32, change "m" to -- $\underline{m}$ --;
           line 45, change "m" to -- $\underline{m}$ --;

UNITED STATES PATENT AND TRADEMARK OFFICE
CERTIFICATE OF CORRECTION

PATENT NO. : 4,334,285
DATED : June 8, 1982
INVENTOR(S) : Kenji Kawakita

It is certified that error appears in the above—identified patent and that said Letters Patent is hereby corrected as shown below:

Column 13, line 59, change "m" to -- $\underline{m}$ --;

Column 14, line 23, change "ther" to -- there --;
           line 28, change "m" to -- $\underline{m}$ --;
           line 30, change "that" to -- with --;
           line 42, change "k" to -- $\underline{k}$ --;
           line 44, change "n" to -- $\underline{n}$ --;
           line 54, change "m" to -- $\underline{m}$ --;
           line 55, change "p" to -- $\underline{p}$ --.

Column 14, line 61, change "n" to -- $\underline{n}$ --;

Column 16, line 47, change "k" to -- $\underline{k}$ --;
           line 52, change "n" to -- $\underline{n}$ --;

Signed and Sealed this

Seventh Day of September 1982

[SEAL]

Attest:

GERALD J. MOSSINGHOFF

Attesting Officer    Commissioner of Patents and Trademarks